M. E. HARRIS.
BREAD RAISER.
APPLICATION FILED AUG. 16, 1917.

1,296,387.

Patented Mar. 4, 1919.
2 SHEETS—SHEET 1.

Inventor
Mary E. Harris,

By Talbert & Parker
Attorneys

M. E. HARRIS.
BREAD RAISER.
APPLICATION FILED AUG. 16, 1917.

1,296,387.

Patented Mar. 4, 1919.
2 SHEETS—SHEET 2.

Inventor
Mary E. Harris,

By Talbert & Parker
Attorneys

UNITED STATES PATENT OFFICE.

MARY ELLA HARRIS, OF MODESTO, CALIFORNIA.

BREAD-RAISER.

1,296,387.　　　　Specification of Letters Patent.　　Patented Mar. 4, 1919.

Application filed August 16, 1917. Serial No. 186,549.

*To all whom it may concern:*

Be it known that I, MARY ELLA HARRIS, a citizen of the United States, residing at Modesto, in the county of Stanislaus and State of California, have invented certain useful Improvements in Bread-Raisers, of which the following is a specification, reference being had therein to the accompanying drawing.

This invention has reference generally to improvements in that class of inventions known as bread pastry and confection making and more particularly relates to a bread mixer and raiser.

It is the principal aim and object of this invention to provide a novel heating receptacle for removably receiving and supporting a dough containing receptacle so that the heat in the main receptacle will act on the dough whereby to raise the same preparatory to cooking it.

It is an equally important object of this invention to provide improved electrical heating means in the heating receptacle with which coöperates the common means in the main receptacle for guiding and supporting the dough receptacle centrally of the main receptacle which in addition deflects the heat so that it will circulate beneath the bottom of the dough receptacle.

More particularly the present invention includes novel agitating means removably mounted in the dough receptacle for mixing the dough, which agitating means is adapted to be moved when the dough receptacle is placed in the heating receptacle.

A more specific object of this invention resides in the improved construction of the heating receptacle as well as the means on the bottom of the dough receptacle for allowing heated air to circulate beneath the bottom thereof.

The invention is clearly illustrated in the accompanying drawings, in which:—

Similar characters of reference are employed in all of the above described views, to indicate corresponding parts.

Figure 1:
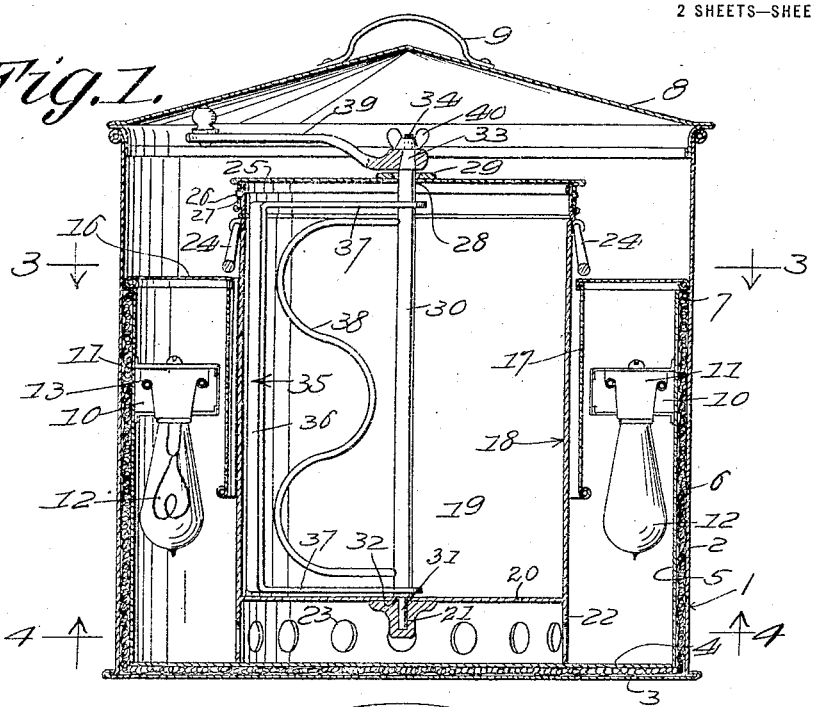
Figure 1 is a vertical section of the invention.
Figure 3:
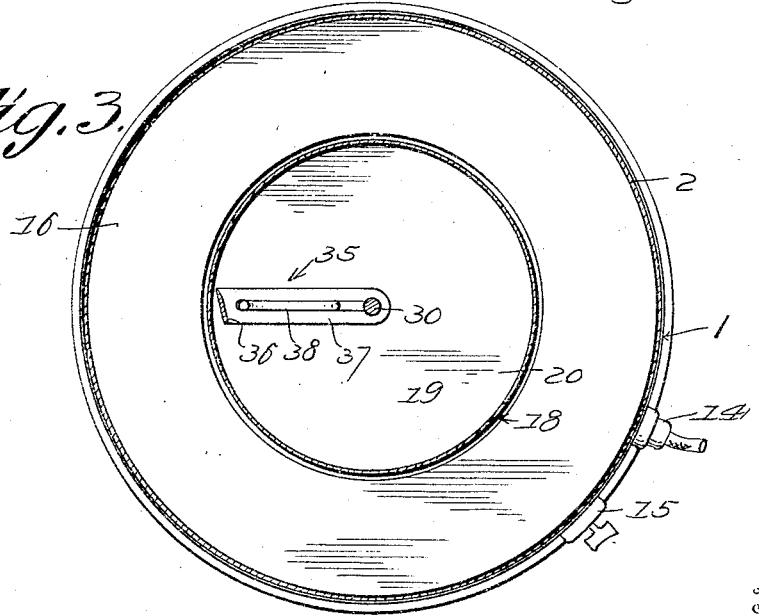
Fig. 3 is a transverse section taken on line 3—3 of Fig. 1.
Figure 2:
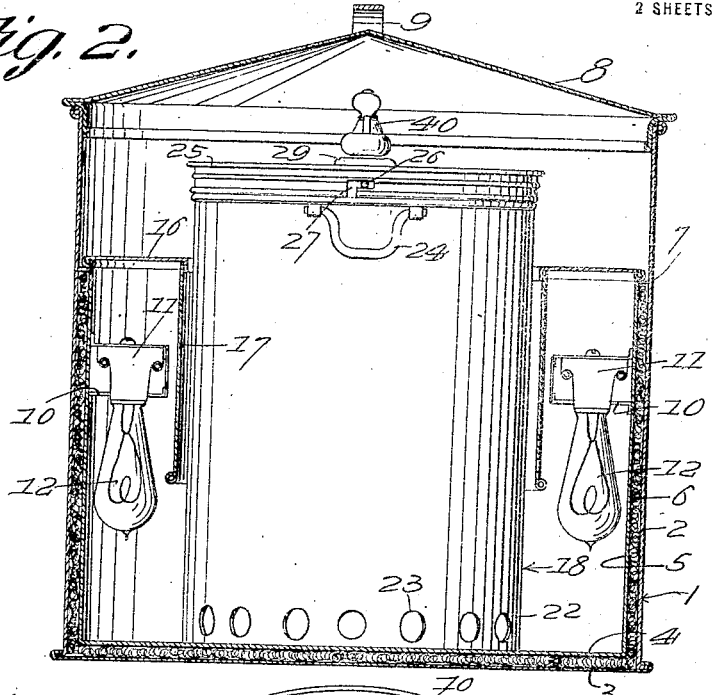
Fig. 2 is a vertical sectional view taken through the main heating receptacle, the dough containing receptacle being shown in elevation.
Figure 4:
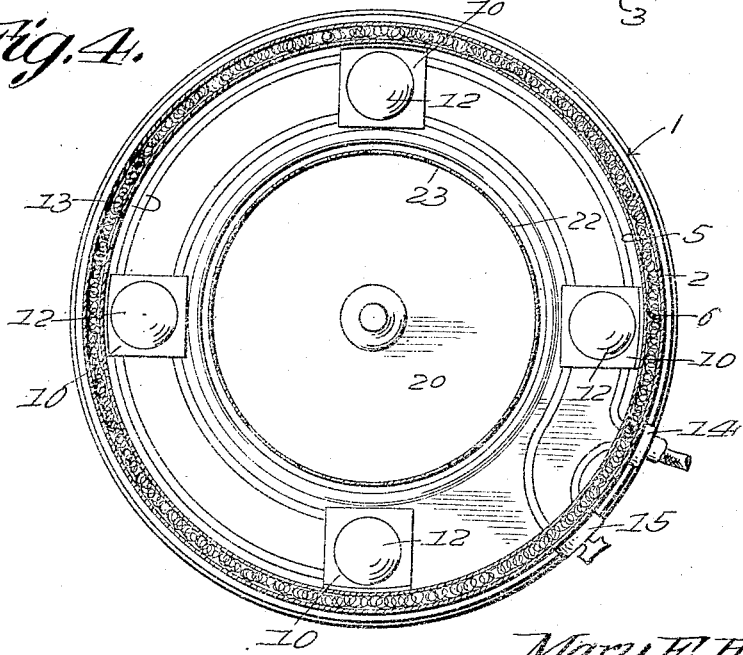
Fig. 4 is a transverse section taken on line 4—4 of Fig. 1 in the direction in which the arrows point.

Referring now, more particularly, to the accompanying drawings, there is provided a main heating receptacle designated in its entirety by the numeral 1 of a cylindrical formation and including an outer wall 2 having a bottom 3 which is spaced from the bottom 4 of the inner wall 5. Suitable non-conducting means such as asbestos 6 is positioned between the walls 2 and 5 as well as the bottom 4 and serves to retain heat within the receptacle. The inner wall 5 terminates beneath the upper edge of the outer wall in an annular shoulder 7 for a purpose that will presently appear. A flange cover 8 serves to removably close the upper ends of the receptacle being engageable with the upper edge of the outer wall while a handle 9 is carried by the cover to facilitate movement thereof.

With a view toward providing improved electrical heating means a plurality of brackets 10 are mounted in opposed relation with respect to each other on the inner surface of the inner wall adjacent the top thereof while sockets 11 are supported by the brackets. Lamps 12 of any suitable design are removably mounted in the sockets and depend therefrom as indicated in the drawings. Conducting wires 13 are passed through a thimble 14 which latter is mounted through the walls of the main receptacle. These wires 13 are connected to the lamps so as to arrange them in circuit while a button operating dimmer switch 15 is interposed in the circuit, which includes the wires in the lamps, for controlling the flow of current to the lamps. The conducting wires of course are adapted to be electrically connected to a main source of energy not shown.

As intimated, improved means have been provided for deflecting the heat toward the bottom of the main receptacle. In reducing this feature of the invention to practice an annular metallic band 16 is arranged within the receptacle and supported in a horizontal position therein by means of a ledge 7 while a guiding and deflecting sleeve 17 has its upper edge connected to the inner periphery of the band and is positioned centrally of the main receptacle and terminates adjacent the lamps for accomplishing an additional purpose that will presently appear.

Removably receivable in the main receptacle is the dough receptacle indicated in its entirety by the numeral 18. This receptacle consists of a body 19 of a cylindrical formation. The bottom 20 is connected to the side walls of the body and is provided with a central socket 21 for a purpose that will presently appear. A supporting flange 22 depends from the bottom and is provided with a circle of suitable ventilating openings 23. Handles 24 are pivotally mounted on the opposite sides of the wall of the body 19 to facilitate the insertion and removal of the dough receptacle in the main receptacle. In inserting the dough receptacle into the main receptacle, the sleeve 17 coöperates with the band 16 in guiding the movement of and properly positioning the dough receptacle centrally of the heating receptacle and in addition the band and sleeve serve as a means for equally distributing the heat which radiates from the lamps in the lower portion of the main receptacle. A cover 25 is provided for removably closing the receptacle 18. An annular flange 27 depends from the cover for engaging the outer surface of the body 19, both the flange 24 and the body 19 being provided with bayonet connections 26 so that the cover may be removably fastened in position. The cover is further provided with a central opening 28 about which on the upper surface thereof is formed a bushing 29 for a purpose that will presently appear.

Suitable means have been provided for agitating the dough in the receptacle 18. In accomplishing this purpose a shaft 30 has one end reduced as at 31 for rotatable movement in the socket 21. The reducing of the shaft at this point forms a shoulder 32 which constitutes a bearing for the shaft. The shaft is also journaled through the opening 28 and the bushing 29 in the cover while the projecting end is tapered as at 33 toward the reduced threaded upper end 34. A dasher indicated in its entirety by the numeral 35 is mounted on the shaft and positioned within the receptacle 18. This dasher consists of a U-shaped frame, the intermediate portion 36 of which is arranged in spaced parallel relation to the shaft 30 and within the receptacle is arranged in close relation with the walls thereof. Side arms 37 extend from the respective ends of the intermediate portion and are rigidly connected to the shaft. A piece of wire 38 has its respective ends anchored in the shaft and its intermediate portion bent sinuously and is arranged in the plane of the frame 35. To rotate the shaft so as to actuate the dasher and agitate the dough in the receptacle 18 a crank handle 39 has its inner ends provided with an opening which is arranged in engagement with the tapered portion 33 of the shaft and removably held rigid with respect to the shaft by means of a wing nut 40 removably engaged with the reduced upper end 34.

The mode of operation of the present invention may be reviewed as follows:

Assuming that the parts have been assembled in the manner described and as indicated in Fig. 1 to mix the dough in the receptacle 18 the handle 39 is engaged and actuated so as to rotate the shaft and the dasher so as to agitate the mixture. Subsequent to agitating the mixture the nut 40 may be removed as well as the handle to permit of the removal of the cover and the consequent removal of the shaft and dasher. After these parts are removed the cover is replaced while the switch 15 is actuated to allow the current to flow through the wires. The heat radiating from the lamps is directed downwardly by the sleeve 17 so that it may circulate through the openings in the flange 22 and contact with the bottom of the receptacle 18.

It is thought in view of the foregoing description that a further detail description of the operation of the invention is entirely unnecessary.

Likewise it is believed that the advantage of the invention will be readily apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent, is:—

1. A device of the character described including a main heating receptacle, heating means in the receptacle, a dough containing receptacle removably mounted in the heating receptacle, common means mounted in the main receptacle for guiding the sliding movement of the dough containing receptacle and for deflecting the heat toward the bottom of the dough containing receptacle, and a cover removably mounted on the main receptacle.

2. A device of the character described including a main heating receptacle, electrical heating means in the main receptacle, means for controlling the flow of electricity through the heating means, an annular band supported in the main receptacle, a sleeve depending from the inner edge thereof, the band and the sleeve deflecting the heat toward the bottom of the receptacle, a dough containing receptacle mounted in the main receptacle and guided during its insertion and supported centrally of the main receptacle by the band and the sleeve, and a cover removably mounted on the main receptacle.

3. A device of the character described including a main heating receptacle the walls of which are formed of heat insulating material, a plurality of sockets supported in the receptacle, a plurality of lamps mounted in the sockets and arranged in series with each other, means for controlling the flow of current to the lamps, an annular band supported horizontally in the receptacle, a sleeve depending from the inner edge of the band, the band and the sleeve deflecting the heat toward the bottom of the receptacle, a dough containing receptacle, a cover therefor, the dough containing receptacle being removably arranged in the main receptacle and guided during its insertion by the band and the sleeve, a flange depending from the bottom of the dough containing receptacle and provided with openings through which the heat circulates, and a cover removably mounted on the main receptacle.

In testimony whereof I affix my signature.

MARY ELLA HARRIS.

Copies of this patent may be obtained for five cents each, by addressing the "Commissioner of Patents, Washington, D. C."